(12) United States Patent
Hosoda

(10) Patent No.: US 8,196,689 B2
(45) Date of Patent: Jun. 12, 2012

(54) SADDLE-TYPE VEHICLE INCLUDING FRONT-END MOUNTED RADIATOR, CONTROLLER CASE AND CONTROLLER HEAT SHIELD

(75) Inventor: Tetsuro Hosoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 12/378,227

(22) Filed: Feb. 12, 2009

(65) Prior Publication Data
US 2009/0242295 A1 Oct. 1, 2009

(30) Foreign Application Priority Data
Mar. 27, 2008 (JP) ................. 2008-082961

(51) Int. Cl.
*B60K 11/04* (2006.01)
(52) U.S. Cl. ............ 180/68.4; 180/68.1; 180/68.5
(58) Field of Classification Search ............. 180/68.5, 180/68.1, 68.4, 291, 287, 311, 426, 403
See application file for complete search history.

(56) References Cited

U.S. PATENT DOCUMENTS

| | | | |
|---|---|---|---|
| 5,595,257 A * | 1/1997 | Yoshida et al. | 180/287 |
| 5,887,671 A * | 3/1999 | Yuki et al. | 180/68.1 |
| 6,702,058 B2 * | 3/2004 | Ishii et al. | 180/311 |
| 6,786,290 B2 * | 9/2004 | Kuji et al. | 180/68.1 |
| 7,070,019 B2 * | 7/2006 | Takamoto et al. | 180/403 |
| 7,216,733 B2 * | 5/2007 | Iwami et al. | 180/68.1 |
| 7,374,009 B2 * | 5/2008 | Yamamoto et al. | 180/291 |
| 7,565,944 B2 * | 7/2009 | Sakamoto et al. | 180/426 |
| 7,730,986 B2 * | 6/2010 | Takeshima et al. | 180/68.5 |
| 7,828,098 B2 * | 11/2010 | Yamamoto et al. | 180/68.5 |

FOREIGN PATENT DOCUMENTS
JP 63-13875 1/1988
* cited by examiner

*Primary Examiner* — Hau Phan
(74) *Attorney, Agent, or Firm* — Carrier Blackman & Associates, P.C.; Joseph P. Carrier; William D. Blackman

(57) ABSTRACT

A saddle-type vehicle including a radiator disposed forwardly of a steering shaft for steering a front wheel, the radiator being covered by a vehicle body cover, the vehicle including a controller case which extends forwardly of the steering shaft of a vehicle body frame, formed separately from the vehicle body cover, and fixed on a frame supporting the radiator. The controller case is positioned rearward of and above the radiator, and is configured such that the controller case supports an electronic controller therein. The saddle-type vehicle also includes a heat shield disposed between the radiator and the controller, wherein the heat shield substantially isolates the controller from heat emitted from the radiator.

20 Claims, 7 Drawing Sheets

SADDLE-TYPE VEHICLE INCLUDING FRONT-END MOUNTED RADIATOR, CONTROLLER CASE AND CONTROLLER HEAT SHIELD

CROSS-REFERENCE TO RELATED APPLICATIONS

The present invention claims priority under 35 USC 119 based on Japanese patent application No. 2008-082961, filed on Mar. 27, 2008. The entire subject matter of this priority document, including specification claims and drawings, is incorporated by reference herein.

BACKGROUND OF THE INVENTION

1. Technical Field of the Invention

The present invention relates to a saddle-type vehicle including a front-end mounted radiator and a front-end mounted controller disposed proximate the radiator. More particularly, the invention relates to a saddle-type vehicle of the type described, including a heat shield for placement above a radiator disposed forward of a steering shaft that steers a front wheel, wherein the heat shield is situated between the radiator and the electronic controller, wherein the heat shield isolates the controller from direct exposure to heat emitted from the radiator.

2. Background Art

A known arrangement for a saddle-type vehicle (in the depicted embodiment, an all-terrain vehicle or ATV), which is capable of running on rough terrain or in an off-road environment, is provided with a radiator disposed at a front end of the vehicle, so that an airflow produced when the vehicle is running can be used to cool fluid passing through the radiator (see, for example, Patent Document 1).

When an electronic control unit (ECU) for performing, for example, a fuel injection (FI) control is to be mounted, a known saddle-type vehicle has the ECU disposed at a rear part of the vehicle.

[Patent Document 1]—Japanese Utility Model Laid-open No. Sho 63-13875

However, when the ECU is to be disposed at the front of the vehicle, arrangements should be made to ensure that the ECU is protected from the thermal effect caused by heat generated by the radiator. The ECU, which also generates heat itself, should also be efficiently cooled. Having the ECU disposed on a vehicle body cover may protect the ECU from such a thermal effect. Such an arrangement, however, requires that a significant change be made in the vehicle body cover, and also requires installation of a lid for covering the ECU while taking necessary steps to ensure proper cooling of the ECU. As such, this type of arrangement leads to a complicated structure.

SUMMARY OF THE INVENTION

It is, accordingly, an object of the present invention, to provide a saddle-type vehicle which allows an ECU to be protected from the thermal effect from a radiator, even if the ECU is disposed at the front part of the vehicle, without complicating a vehicle body cover structure. To achieve the foregoing object, according to a first aspect and feature of the present invention, a saddle-riding type vehicle is provided which includes a radiator disposed forwardly of a steering shaft for steering a front wheel, the radiator being covered by a vehicle body cover, the vehicle comprising: a controller case which extends forwardly of the steering shaft of a vehicle body frame, the controller case being formed separately from the vehicle body cover and fixed on a frame supporting the radiator, such that the controller case is positioned rearward and upward of the radiator, wherein the controller case supports an electronic controller; and a heat shield disposed between the radiator and the controller, wherein the heat shield shields the controller from heat emitted from the radiator. As such, the heat shield shields the heat emitted from the radiator, so that an exhaust draft can be prevented from being blown against the electronic control part.

According to the above arrangement, the electronic control part can be made to be less subjected to thermal effect from the radiator.

According to a second aspect and feature of the present invention, the controller case is formed into a box having an open upper portion for holding the electronic control part. The controller case may preferably include an intake portion disposed in a wall on a forward side of the vehicle, the intake portion for introducing an airflow generated as the vehicle is running, and an exhaust portion disposed at a position different from the intake portion. The controller case may also include a rib protruding upwardly and formed on a panel portion of the box. In accordance with the foregoing arrangements, the electronic control part can be cooled with the airflow generated as the vehicle runs and introduced through the intake portion.

According to the above arrangement, the airflow generated as the vehicle runs and introduced through the intake portion can therefore be directed to the bottom portion of the electronic control part, so that the electronic control part itself can be efficiently cooled.

According to a third aspect and feature of the present invention, the rib extends from the intake portion toward the exhaust portion. As such, the rib can be used for guiding airflow.

According to the above arrangement, a flow rate of the airflow can be slowed inside the controller case and the airflow contacts the electronic control part for a longer period of time, so that the electronic control part can be efficiently cooled. Moreover, the rib helps smooth the airflow for a reduced likelihood of turbulence occurring in the airflow. This again ensures efficient cooling of the electronic control part.

According to a fourth aspect and feature of the present invention, the exhaust portion is disposed at a side portion of the controller case and the airflow generated as the vehicle runs and introduced from the intake portion disposed at a vehicle forward position is discharged sideways of the vehicle.

According to the above arrangement, by changing the direction of the airflow, the airflow is decelerated for a longer period of time resulting in the air staying in the controller case for a longer period of time. This results in a longer period of time of heat exchange between the airflow and the electronic control part to achieve even more effective cooling of the electronic control part.

Although the known arrangements for a saddle-type vehicle have some utility for their intended purposes, a need still exists in the art for an improved arrangement for a saddle-type vehicle. In particular, there is a need for an improved an improved arrangement for a saddle-type vehicle which that allows an electronic control unit to be protected from the thermal effect from a radiator while not complicating a vehicle body cover structure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A selected illustrative embodiment of the present invention will now be described, with reference to the drawings. Throughout this description, relative terms like "front", "rear", "longitudinal," "crosswise," "vertical," and the like are used in reference to a vantage point of an operator of the vehicle, seated on the driver's seat and facing forward. It should be understood that these terms are used for purposes of illustration, and are not intended to limit the invention.

Figure 1:
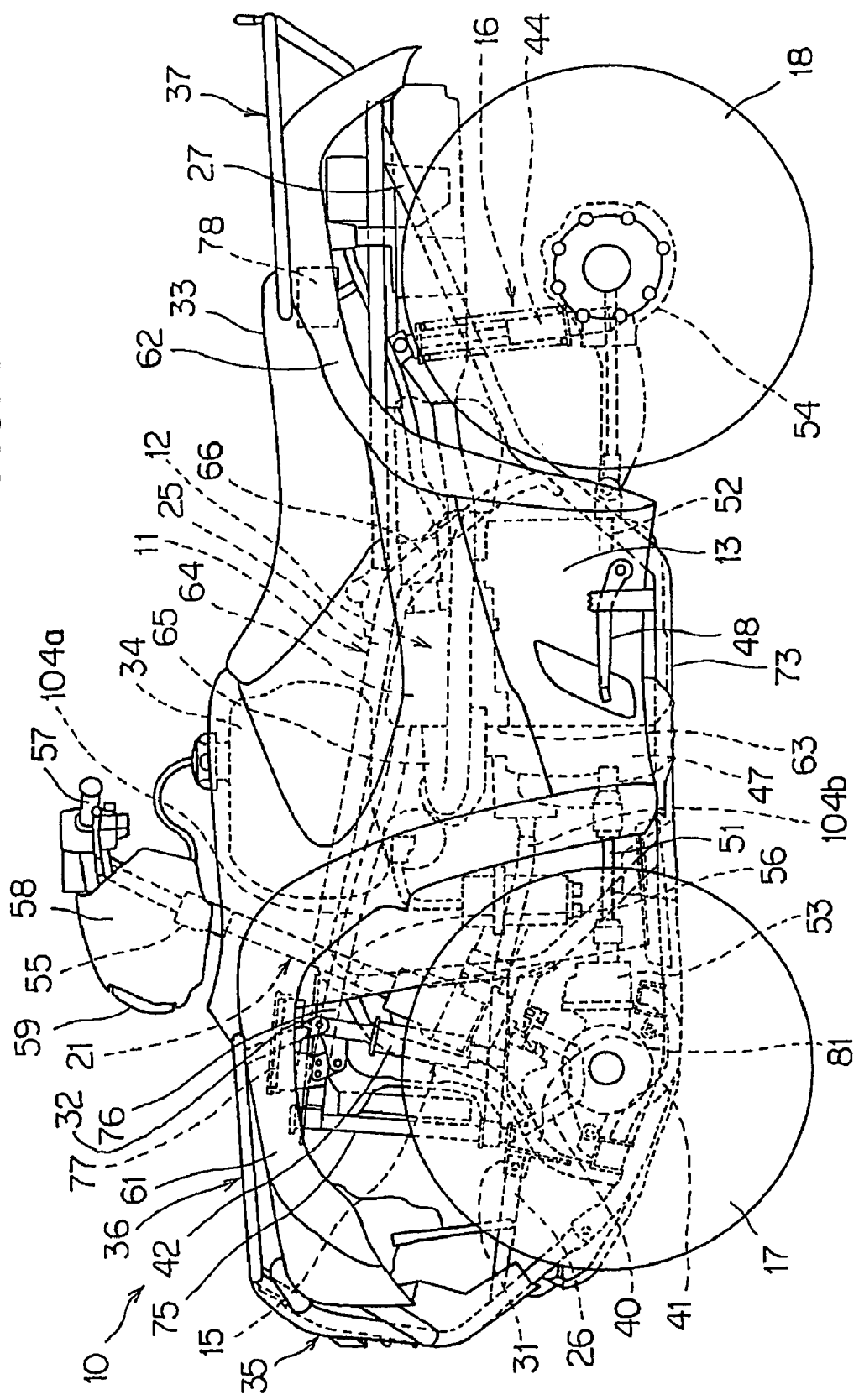
FIG. 1 is a side elevational view showing a saddle type vehicle according to an exemplary embodiment of the present invention.

As shown in FIG. 1, a saddle-type all-terrain vehicle 10 (hereinafter referred to, simply, as "saddle-type vehicle 10") includes a vehicle body frame 11, an engine 12, a power transmission system 13, a front suspension 15, a rear suspension 16, and a steering system 21. Specifically, the engine 12 is mounted at a center lower portion of the vehicle body frame 11. The power transmission system 13 is connected to the engine 12 and mounted on the vehicle body frame 11. The front suspension 15 and the rear suspension 16 suspend left and right front wheels 17, 17 and left and right rear wheels 18, 18, respectively. The steering system 21 is connected to the front wheels 17, 17 and mounted on the vehicle body frame 11.

The vehicle body frame 11 includes a main frame 25, a front frame 26, a rear frame 27, a bracket 31, and a cross member 32. Specifically, the front frame 26 and the rear frame 27 are mounted at the front and rear of the main frame 25, respectively. The bracket 31 is mounted across the front frame 26 at a lower portion thereof. The cross member 32 is mounted across the front frame 26 at an upper portion thereof. The saddle type vehicle 10 also includes a seat 33 mounted on the main frame 25, a fuel tank 34, a front guard 35 mounted on the front frame 26; a front carrier 36 mounted on the front frame 26 and a rear carrier 37 mounted at a rear portion of the main frame 25.

The front suspension 15 is an independent suspension for the left and right wheels. The front suspension 15 includes a pair of left and right front upper arms 40, 40, a pair of left and right front lower arms 41, 41, and a pair of front shock absorbers 42, 42. The front upper arms 40, 40 and the front lower arms 41, 41 are mounted so as to be pivotally reciprocally movable on the vehicle body frame 11. The front shock absorbers 42, 42 are mounted across the front upper arms 40, 40 and the cross member 32. The rear suspension 16 includes a rear shock absorber 44 mounted on the vehicle body frame 11.

The power transmission system 13 includes a transmission 47, a gear change pedal 48, a front drive shaft 51, a rear drive shaft 52, a front final reduction gear 53, and a rear final reduction gear 54. Specifically, the transmission 47 is connected to an output shaft of the engine 12. The front drive shaft 51 and the rear drive shaft 52 are connected to the front and rear of the transmission 47, respectively. The front final reduction gear 53 is connected to the front drive shaft 51 and mounted on a side of the vehicle body frame 11. The rear final reduction gear 54 is connected to the rear drive shaft 52.

The steering system 21 includes a steering shaft 56 and a handlebar 57. Specifically, the steering shaft 56 is mounted at a front upper portion of the main frame 25 with a shaft holder 55. The handlebar 57 is attached to the steering shaft 56. In addition, a headlight 59 for illuminating the forward of the vehicle body is mounted forward of the handlebar 57. The headlight 59 is covered in a headlight cover 58. The main frame 25 also includes a front fender 61 covering an area upward of the front wheels 17, 17 and a rear fender 62 covering an area upward of the rear wheels 18, 18.

In the depicted embodiment, the engine 12 is a four-cycle engine including a cylinder block 63, a cylinder head 64, an exhaust system 65, and a throttle body 66. The cylinder head 64 is mounted on an upper portion of the cylinder block 63. The exhaust system 65 is connected to a front portion of the cylinder head 64. The throttle body 66 is mounted at a rear portion of the cylinder head 64. A valve actuating mechanism, a piston inserted movably in the cylinder block 63, and a crankshaft connected to the piston via a connecting rod are housed in the cylinder head 64. Additionally, an under body splash member 73 covering a substantially entire underside of the vehicle body is disposed under the engine 12.

A radiator 75 for cooling the engine 12 is disposed forward of the steering shaft 56. The radiator 75 and the engine 12 are connected by an upper hose 104a and a lower hose 104b. Coolant is supplied to, and circulated through, the engine 12 via the upper hose 104a and the lower hose 104b. Note that the coolant is fed through the cooling system by a water pump (not shown) of the engine 12. Specifically, a heated part of the coolant, flowing from the cylinder head 64 of the engine 12 toward an upper portion of the radiator 75, flows through the upper hose 104a, while another part of the coolant that has been cooled by passing through the radiator flows from a lower portion of the radiator 75 through the lower hose 104b, and toward the side of a crankcase.

A pair of right and left front frame sections 76 extending forwardly of the steering shaft 56 cooperate to support the radiator 75 thereon. An electronic control unit 77 (ECU 77) is operatively attached to the front frame sections 76 at a position rearward of and above the radiator 75, as seen in a side view. A battery 78 is mounted, on the other hand, at a rear portion of the vehicle body. The ECU 77 and the battery 78 are connected together by a wiring harness (not shown), and power from the battery 78 is supplied to the ECU 77 through the wiring harness.

Figure 2:
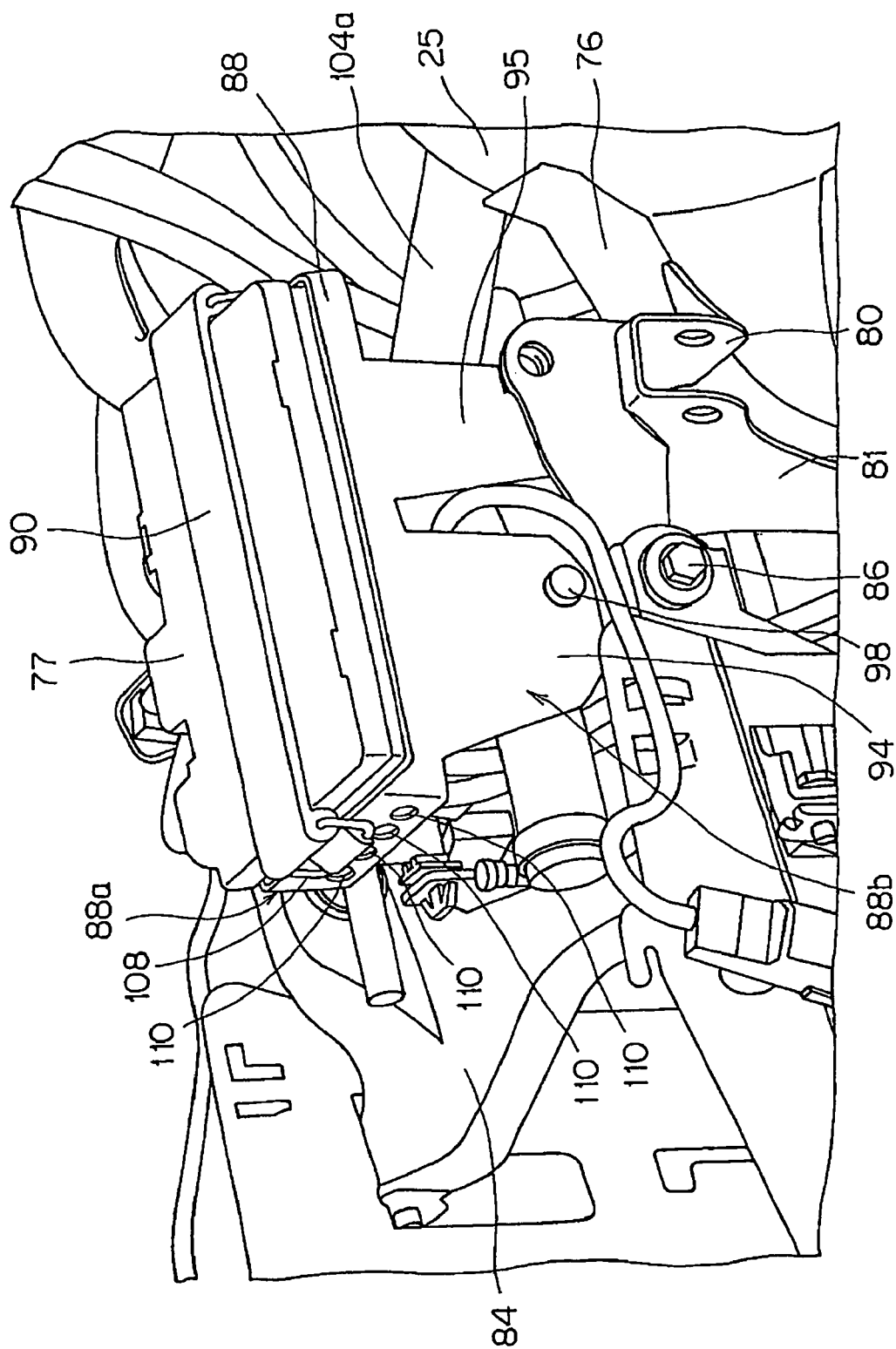
FIG. 2 is a perspective view showing an arrangement in which an electronic control unit (ECU) is disposed at a front portion of a vehicle body according to an exemplary embodiment of the present invention.

FIG. 2 is a perspective view showing an arrangement in which the ECU 77 is disposed at the front portion of the vehicle body, as viewed from a left obliquely upward direction. As shown in FIG. 2, a shock absorber support portion 80 is disposed at the frame section 76 of the front frame 26, for supporting an upper portion of the front shock absorber 42 thereon (see FIG. 1). The front shock absorber 42 also has a lower portion mounted on a lower frame section 81 of the front frame 26.

The frame section 76 has a front end portion, on which an upper portion of a fan stay 84 is mounted with a bolt 86, for mounting a fan motor 82 of a fan used for cooling the radiator 75. The radiator 75 is disposed at a front of the fan stay 84 and mounted on the lower frame section 81 (see FIG. 1) of the front frame 26.

Referring to FIG. 2, the ECU 77 is mounted on the frame section 76 via a controller case 88, which is formed separately from a vehicle body cover. More specifically, a flexible elastic strap 90 is mounted on an upper portion of the controller case 88 so as to extend in a vehicle longitudinal direction, and such that the ECU 77 is pressed against the upper portion of the controller case 88 by the elasticity of the strap 90.

Figure 3:
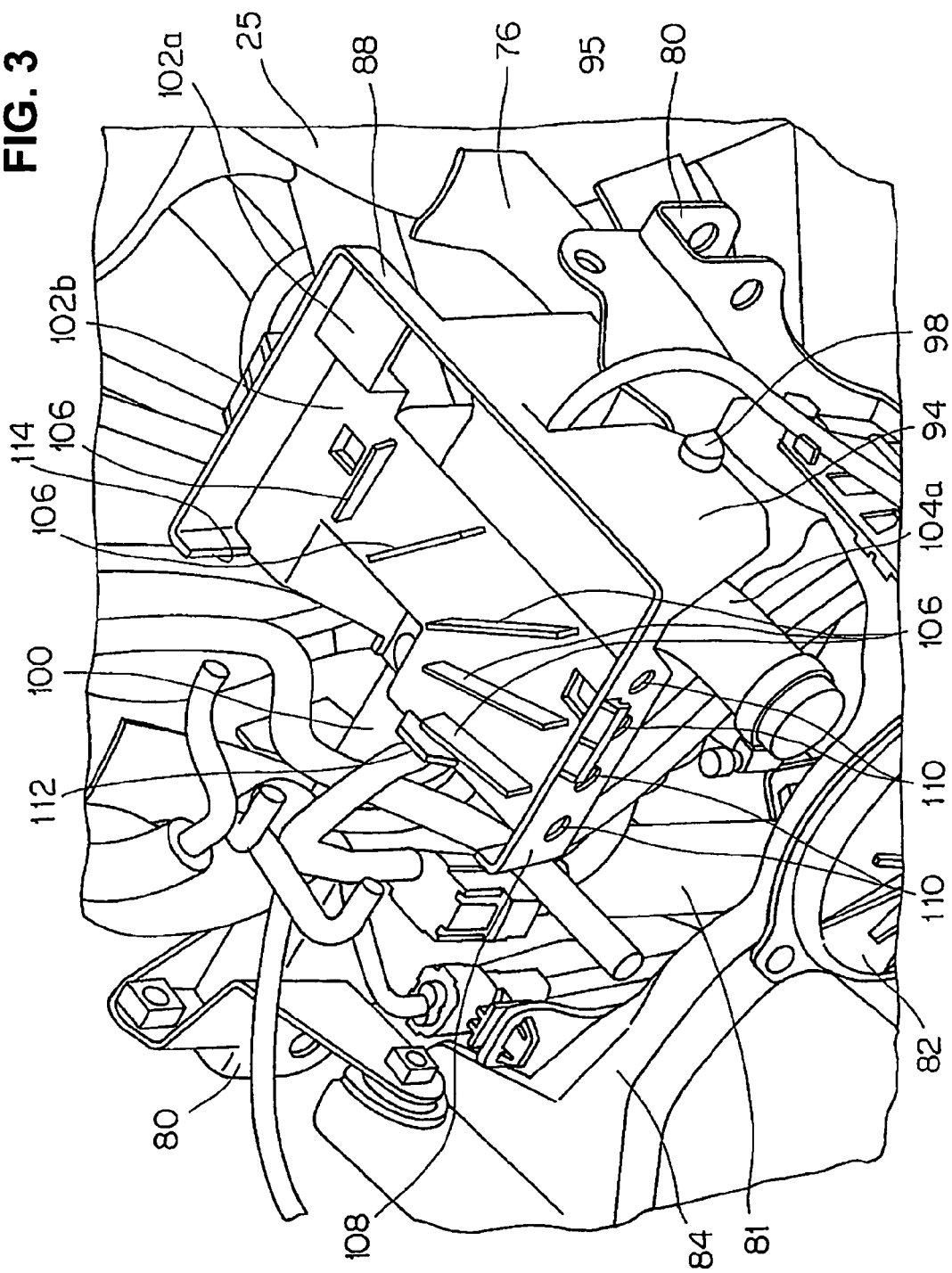
FIG. 3 is a perspective view showing an arrangement in which a controller case is mounted at the front portion of the vehicle body according to an exemplary embodiment of the present invention.
Figure 4:
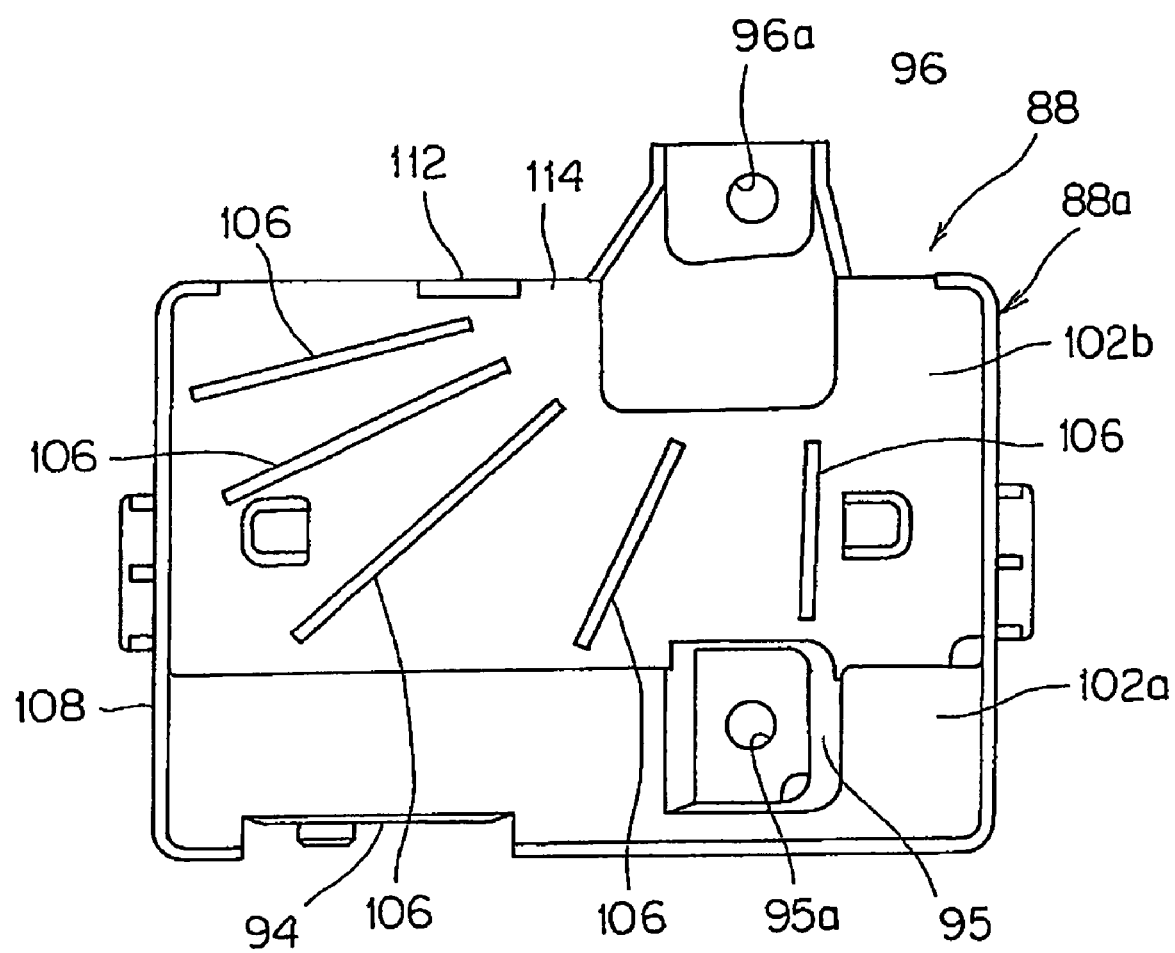
FIG. 4 is a plan view showing the controller case according to an exemplary embodiment of the present invention.
Figure 5:
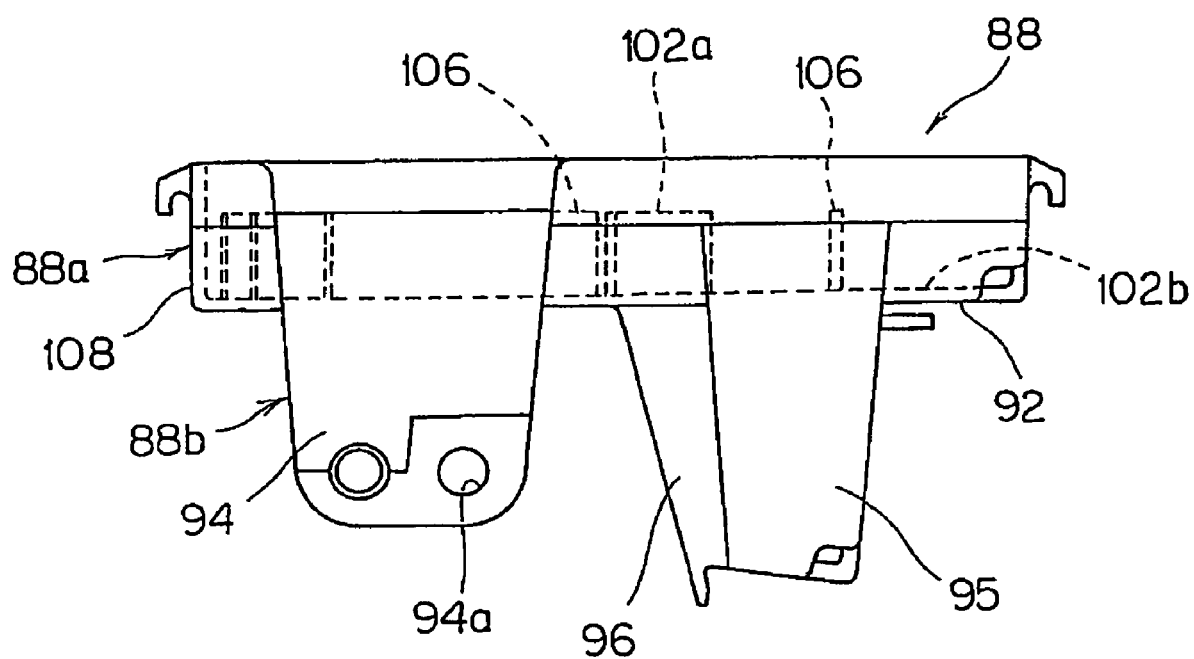
FIG. 5 is a side elevational view showing the controller case according to an exemplary embodiment of the present invention.
Figure 6:
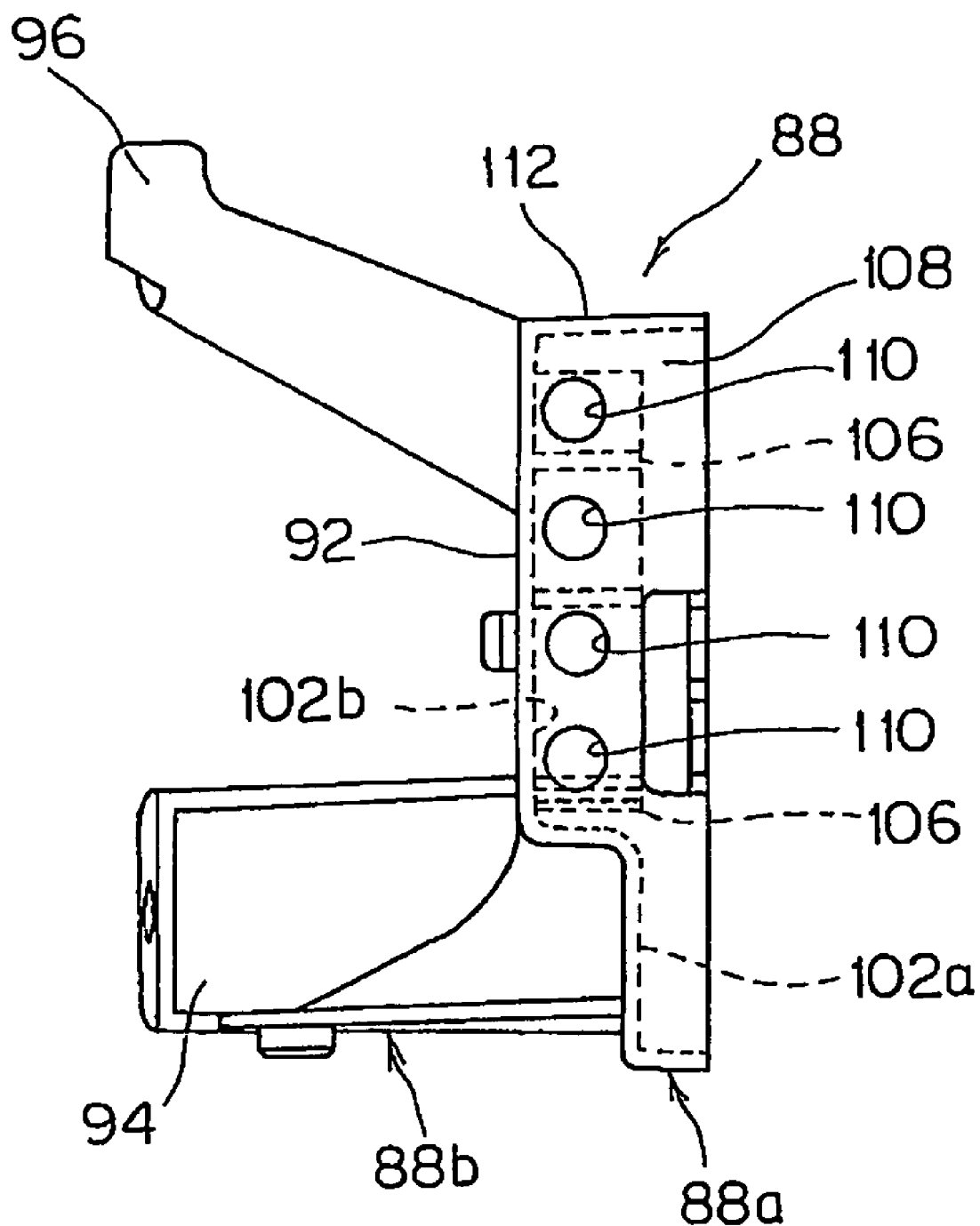
FIG. 6 is a front view showing the controller case according to an exemplary embodiment of the present invention.

FIG. 3 is a perspective view showing an arrangement in which the ECU 77 shown in FIG. 2 has been removed from the controller case 88 for illustrative purposes. Further, FIG. 4 is a top plan view showing the controller case 88; FIG. 5 is a side elevational view showing the controller case 88; and FIG. 6 is a front view showing the controller case 88.

The controller case 88 may be formed as a one-piece molding made of a plastic resin material. The controller case 88 may have a substantially rectangular shape in a plan view, as shown in FIGS. 3 and 4.

The controller case 88 also has an upper section 88a that may be formed into a box shape opening upwardly as shown in FIGS. 3 to 6. The upper section 88a has a panel portion formed in two parts: a smaller left panel portion 102a, and a larger right panel portion 102b. The left panel portion 102a is formed to be higher than the right panel portion 102b. Referring now to FIG. 3, the upper hose 104a for transporting coolant to the radiator 75 is routed on the underside of the left panel portion 102a. The left panel portion 102a is elevated at the higher level, as shown, to permit passage of the hose 104a therebelow. In addition, the ECU 77 is mounted inside of the box-shaped upper section 88a of the controller case 88, substantially in alignment with the left panel portion 102a.

The right panel portion 102b of the controller case 88 has a plurality of ribs 106 formed thereon and protruding upwardly therefrom. Each of the ribs 106 is formed to extend from an intake hole 110 formed in a front wall portion 108 of the upper section 88a of the controller case 88 toward an exhaust air outlet 114 formed in a right side wall portion 112 of the upper section 88a of the controller case 88. This arrangement allows an airflow, generated as the vehicle runs and taken in through the intake hole 110 at the front end of the vehicle body, to be directed toward, and discharged from, the exhaust air outlet 114. The airflow taken in is also blown against a bottom surface of the ECU 77 to cool the ECU 77. The ribs 106 elevate the ECU 77 to permit air to flow past the bottom surface thereof, in order to more effectively cool the ECU 77.

Note that, in FIG. 6, there is provided a plurality of round intake holes 110. However, the intake hole 110 is not required to be round in shape, but instead, may be a rectangular hole, or a single slot elongated in a crosswise direction. Similarly, though there is one exhaust air outlet 114 provided according to the exemplary embodiment of the present invention, there may be a plurality of exhaust air outlets 114.

The intake holes 110 are formed in the front wall, the exhaust air outlet 114 is formed in the right side wall portion 112, and the ribs 106 are used to discharge the airflow from the right-hand side. These arrangements are intended to achieve an efficient heat transfer between the heat of the ECU 77 and the air flowing therepast, by temporarily slowing the flow rate of the airflow taken in so as to extend the time period during which the airflow contacts the ECU 77. Further, the ribs 106 may be shaped into a mild curve to prevent or minimize turbulence as the airflow contacts the ribs 106.

The ribs 106 are integrally formed with the controller case 88. Further, the ribs 106 are formed to be substantially as high as the left panel portion 102a, such that upper ends of the ribs 106 support a right bottom portion of the ECU 77. Note that not all ribs 106 are necessarily as high as the left panel portion 102a; rather, at least any one of the ribs 106 is as high as the left panel portion 102a to support the bottom portion of the ECU 77 with the left panel portion 102a.

Three mounting extensions 94, 95, 96 are disposed on a bottom section 88b of the controller case 88. The mounting extensions 94, 95, 96 protrude downwardly from a panel portion 92 of the controller case 88. The mounting extension 94 disposed at the front left side of the controller case 88 includes a mounting hole 94a formed in a side face thereof. The mounting hole 94a is aligned with a mounting hole (not shown) formed at a front of the frame section 76, and the mounting extension 94 is mounted using a grommet 98. The mounting extension 95 disposed at the rear left side of the controller case 88 includes a mounting hole 95a formed in a panel portion protruding downwardly as shown in FIG. 4. The mounting extension 95 is attached with a bolt inserted in a mounting hole (not shown) disposed in a cross pipe 100 (see FIG. 3) that connects the right and left front frame sections 76.

Further, the mounting extension 96 disposed at the rear right side of the controller case 88 includes, like the mounting extension 95, a mounting hole 96a formed in a panel portion thereof. The mounting extension 96 is attached with a bolt inserted in a mounting hole (not shown) disposed in the cross pipe 100 (see FIG. 3).

Figure 7:
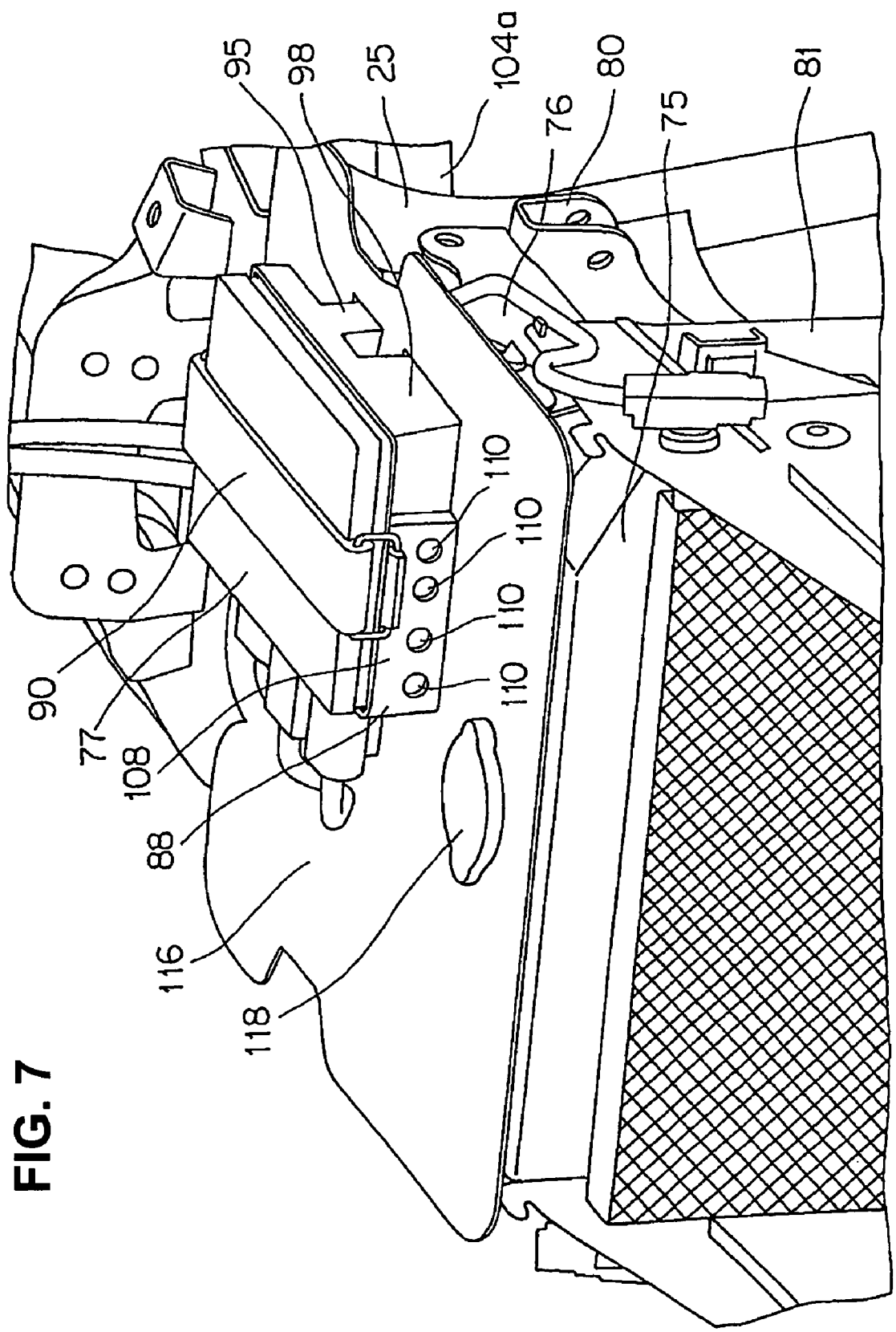
FIG. 7 is a perspective view showing an arrangement in which a heat shield is mounted at a front portion of the vehicle body according to an exemplary embodiment of the present invention.

FIG. 7 is a perspective view showing an arrangement in which a heat shield 116 is mounted on the underside of the ECU 77. As previously noted, during vehicle operation, the coolant, with a high temperature as a result of absorbing heat from the cylinder head side, flows through the upper hose 1 04a connected to the radiator 75. Further, the radiator 75 itself emits heat which has been removed from the liquid coolant flowing therein. The heat shield 116 effectively protects the ECU 77 from such emitted heat.

The heat shield 116 is formed from a plastic resin, elastomeric or rubber material, and is made in a substantially flat form having a substantially rectangular outline shape, as shown in FIG 7. The heat shield 116 is disposed such that the front portion of the vehicle body is partitioned into an upper half and a lower half. After the heat shield 116 is installed, a radiator cap 118 is installed at an upper portion of the radiator 75, and then the controller case 88 is inserted from above. Note that the heat shield 116 includes a plurality of cutout openings formed therein and shaped to have profiles of the radiator cap 118 and the respective mounting extensions 94, 95, 96 of the controller case 88. The cutout openings are respectively situated at positions on the heat shield 116 where the radiator cap 118 and the mounting extensions 94, 95, 96 are mounted.

The heat shield 116 is adapted such that the ECU 77, the intake holes 110, and the exhaust air outlet 114 are disposed above the heat shield 116 when the controller case 88 and the ECU 77 are mounted in place. In addition, the upper hose 104a is disposed below the heat shield 116. Through the foregoing arrangements, the heat shield 116 shields both heat discharged from the radiator 75 and heat transferred from the upper hose 104a, thereby minimizing heat transfer or preventing heat from being transferred to an upper side of the heat shield 116. The ECU 77, disposed on the upper side of the heat shield 116, is thereby protected from excessive heat transfer.

In addition, the heat shield 116 is formed to be flat at a portion thereof forward of the controller case 88. The heat shield 116 thereby performs a function as an air guide plate guiding the airflow generated as the vehicle runs into the intake holes 110 in the controller case 88.

The saddle-type vehicle according to the exemplary embodiment of the present invention includes the front frame sections 76 extending forwardly of the steering shaft 56, the front frame sections 76 having front ends for supporting the radiator 75. The vehicle further includes the controller case 88, for holding the ECU 77, disposed rearwardly and upwardly of the radiator 75. The vehicle additionally includes the heat shield 116 between the radiator 75 and the ECU 77 in a side view, the heat shield 116 for shielding the heat and heat from the radiator 75. This prevents an exhaust draft from being blown against the ECU 77. As a result, the ECU 77, even if disposed at the front portion of the vehicle body, can be protected from thermal effect from the radiator 75.

Additionally, the radiator 75 and the upper hose 104a are disposed below the heat shield 116 and the ECU 77 is disposed above the heat shield 116, such that the ECU 77 is protected from thermal effect also from the upper hose 104a.

Further, the upper section 88a of the controller case 88, which holds the ECU 77, is formed into a box shape opening upwardly. The intake holes 110 are formed in the front wall portion 108 of the controller case 88 to let the airflow, which is generated as the vehicle runs, flow in and the exhaust air outlet 114 is formed in the right side wall portion 112 different from the portion in which the intake holes 110 are formed. Further, the right panel portion 102b of the box shape includes the plurality of ribs 106 formed thereon to protrude upwardly. The ECU 77 is mounted so as to be placed on the upper section 88a. The airflow introduced through the intake holes 110 is made to flow through a space between the ECU 77 and the right panel portion 102b of the controller case 88. The airflow can therefore be blown against the bottom of the ECU 77 to cool the ECU 77 efficiently.

Moreover, the ribs 106 are adapted to extend from the intake holes 110 toward the exhaust air outlet 114, so that the ribs 106 can be used as the air guide plate guiding the airflow generated as the vehicle runs. This helps prevent turbulence from occurring in the airflow. This again enables efficient cooling of the ECU 77. The ribs 106 also help to enhance stiffness of the controller case 88. The exhaust air outlet 114 is disposed on a side of the controller case 88 so that airflow introduced from the intake holes 110, disposed at a forward portion of the vehicle, can be discharged sideways of the vehicle. By changing the direction of the airflow in this manner, the airflow is decelerated for a longer period of time thus allowing the air to stay in the controller case 88 for a longer period of time. This results in a longer period of time of heat exchange between the airflow and the ECU 77 to achieve even more effective cooling of the ECU 77.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

For example, in the exemplary embodiment of the present invention, the ribs 106 are formed integrally with the controller case 88; however, the ribs 106 may be formed separately. If the ribs 106 are to be formed from an independent member, an elastic member having a vibration damping function may be used for the rib.

As a further example, the right side wall portion 112 of the controller case 88 includes the exhaust air outlet 114 formed therein for discharging the airflow. This is, however, not the only possible arrangement. Specifically, in the exemplary embodiment of the present invention, the exhaust air outlet 114 is formed in the right side wall portion 112 of the controller case 88 in order to circumvent the upper hose 104a routed on the left underside of the controller case 88. The exhaust air outlet 114 may, instead, be formed in a left side wall portion by changing the position of routing the upper hose 104a. Alternatively, the exhaust air outlet 114 may be formed in both of the right and left side wall portions. In this case, the ribs 106 may be directed toward the exhaust air outlets 114 to ensure that no turbulence occurs, so that the airflow can be used to cool the ECU 77 efficiently.

What is claimed is:

1. A saddle-type vehicle comprising:
   a vehicle body frame;
   a steering shaft operatively attached to the vehicle body frame for steering a front wheel of the vehicle;
   a radiator operatively attached to a frame section of the vehicle body frame, the radiator disposed in front of the steering shaft;
   a controller case operatively attached to the frame section of the vehicle body frame supporting the radiator, the controller case disposed in front of the steering shaft, and positioned behind and above a top portion of the radiator;
   an electronic controller which is disposed in the controller case; and
   a heat shield disposed above the top portion of the radiator and interposed between the radiator and the electronic controller, wherein the heat shield shields the controller from heat generated by the radiator.

2. The saddle-type vehicle according to claim 1, wherein:
   the controller case is formed with a substantially box-shaped open upper section for receiving the controller;
   the controller case having a front wall with an intake opening formed therein to introduce an airflow into the controller case as the vehicle runs, and an exhaust air outlet formed therein and spaced apart from the intake opening; and
   the controller case further includes at least one rib formed on and protruding upwardly from a panel portion thereof.

3. The saddle-type vehicle according to claim 2, wherein the rib extends from an area proximate the intake opening toward the exhaust air outlet.

4. The saddle-type vehicle according to claim 3, wherein the exhaust air outlet is disposed at a side portion of the controller case, and the airflow which is introduced through the intake opening, is discharged in a direction extending substantially sideways of the vehicle.

5. The saddle-type vehicle according to claim 2, wherein the exhaust air outlet is disposed at a side portion of the controller case, and the airflow which is introduced through the intake opening, is discharged in a direction extending substantially sideways of the vehicle.

6. The saddle-type vehicle according to claim 1, wherein:
   said controller case is formed such that an upper section thereof is formed in a box shape opening upwardly;

said upper section includes a left panel portion and a right panel portion, wherein said left panel portion is formed to be higher than said right panel portion.

7. The saddle-type vehicle according to claim 6, further comprising:
an upper hose for transporting coolant to said radiator and a lower hose for transporting coolant from said radiator, wherein
said upper hose is routed below said left panel portion.

8. The saddle-type vehicle according to claim 7, wherein said controller is mounted so as to be placed inside of said upper section of said controller case, substantially in alignment with the left panel portion.

9. The saddle type vehicle according to claim 1, further comprising:
an upper hose for transporting coolant to said radiator and a lower hose for transporting coolant from said radiator, wherein
said upper hose is routed below said controller case.

10. The saddle-type vehicle of claim 1, wherein the heat shield comprises a panel having a cutout opening formed therein, and wherein a lower section of the controller case extends downwardly through the cutout opening of the heat shield.

11. In a saddle-type vehicle having a pair of left and right frame sections extending forwardly of a steering shaft, said left and right frame sections having front ends for supporting a radiator thereon; and
an upper hose for transporting coolant to said radiator and a lower hose for transporting coolant from said radiator; the improvement comprising:
a controller case, for holding a controller, disposed rearwardly and upwardly of a top portion of said radiator;
and a heat shield positioned above the top portion of said radiator between said radiator and said controller, wherein said heat shield resists passage of heat emitted from said radiator therethrough; wherein
said radiator and said upper hose are disposed below said heat shield, and said controller is disposed above said heat shield.

12. The saddle-type vehicle according to claim 11, wherein:
said controller case is formed having an open box-shaped upper section for holding said controller;
the controller case includes an intake opening formed in a front wall thereof, the intake opening being formed to introduce an airflow generated as the vehicle runs, and an exhaust air outlet disposed at a position different from the intake opening; and
the controller case further includes at least one rib formed on and protruding upwardly from a panel portion thereof.

13. The saddle-type vehicle according to claim 12, wherein said at least one rib extends from an area proximate the intake opening toward the exhaust air outlet.

14. The saddle-type vehicle according to claim 13, wherein the exhaust air outlet is formed in a side portion of the controller case and the airflow generated as the vehicle runs, which is introduced from the intake opening, is discharged in a direction extending substantially sideways of the vehicle.

15. The saddle-type vehicle according to claim 12, wherein the exhaust air outlet is formed in a side portion of the controller case and the airflow generated as the vehicle runs, which is introduced from the intake opening, is discharged in a direction extending substantially sideways of the vehicle.

16. The saddle-type vehicle according to claim 11, wherein:
said controller case is formed such that an upper section of said controller case is formed into a box shape opening upwardly;
said upper section includes a left panel portion and a right panel portion, wherein said left panel portion is formed to be higher than said right panel portion.

17. The saddle-type vehicle according to claim 16, wherein said upper hose is routed below said left panel portion.

18. The saddle-type vehicle according to claim 17, wherein said controller is mounted inside of said upper section of said controller case, with a lower surface thereof substantially in alignment with the left panel portion.

19. The mounting structure of claim 11, wherein the heat shield comprises a panel having a cutout opening formed therein, and wherein a lower section of the controller case extends downwardly through the cutout opening of the heat shield.

20. A saddle-seat vehicle comprising:
a vehicle body frame;
a steering shaft operatively attached to the vehicle body frame for steering a front wheel of the vehicle;
a radiator operatively attached to a frame section of the vehicle body frame, the radiator disposed in front of the steering shaft;
a controller case operatively attached to the frame section of the vehicle body frame supporting the radiator, the controller case disposed in front of the steering shaft, and positioned behind and above a top portion of the radiator;
an electronic controller which is disposed in the controller case; and
a heat shield having a flat plate shape disposed in a substantially horizontal plane above the top portion of the radiator and below the electronic controller, wherein the heat shield shields the controller from both the airflow and heat generated by the radiator.

* * * * *